United States Patent [19]

Nishihara

[11] Patent Number: 5,561,712

[45] Date of Patent: Oct. 1, 1996

[54] HANDS FREE PHONE SET WITH HAND HELD REMOTE CONTROL FOR CONTROLLING TELEPHONIC FUNCTIONS

[75] Inventor: Toshiyuki Nishihara, Shropshire, United Kingdom

[73] Assignee: NEC Corporation, Tokyo, Japan

[21] Appl. No.: 896,975

[22] Filed: Jun. 11, 1992

[30] Foreign Application Priority Data

Jun. 11, 1991 [GB] United Kingdom .................. 9112540

[51] Int. Cl.⁶ .............................. H04M 11/00; H04M 1/57
[52] U.S. Cl. ............................. 379/355; 379/58; 379/61; 379/142; 379/200; 379/376; 379/387; 379/441; 379/185
[58] Field of Search .................................. 379/56, 57, 58, 379/61, 62, 63, 102, 142, 167, 170, 172, 185, 215, 355, 354, 356, 357, 372, 376, 387, 388, 396, 441, 442, 443, 200, 188

[56] References Cited

U.S. PATENT DOCUMENTS

| | | | |
|---|---|---|---|
| 4,130,738 | 12/1978 | Sandstedt ................................ | 379/355 |
| 4,220,820 | 9/1980 | Mallien, II .............................. | 379/90 |
| 4,291,411 | 9/1981 | Müller et al. ........................... | 455/88 |
| 4,450,319 | 5/1984 | Lucey ..................................... | 379/56 |
| 4,508,935 | 4/1985 | Mastromoro ........................... | 379/62 |
| 4,542,262 | 9/1985 | Ruff ....................................... | 379/56 |
| 4,601,011 | 7/1986 | Grynberg ............................... | 379/95 |
| 4,682,357 | 7/1987 | Irino ....................................... | 379/356 |
| 4,761,806 | 8/1988 | Toki ....................................... | 379/61 |
| 4,794,642 | 12/1988 | Arbadzadah et al. .................. | 379/200 |
| 4,805,211 | 2/1989 | Brennan et al. ........................ | 379/355 |
| 4,847,887 | 7/1989 | Suzuki et al. .......................... | 379/58 |
| 4,852,146 | 7/1989 | Hathcock et al. ...................... | 379/58 |
| 5,020,097 | 5/1991 | Tanaka et al. .......................... | 379/102 |
| 5,054,051 | 10/1991 | Hoff ....................................... | 379/355 |
| 5,099,507 | 3/1992 | Mukai et al. ........................... | 379/57 |
| 5,119,414 | 6/1992 | Izumi ..................................... | 379/357 |
| 5,138,649 | 8/1992 | Krisbergh et al. ..................... | 379/56 |
| 5,146,493 | 9/1992 | Kiguchi et al. ........................ | 379/355 |
| 5,201,067 | 4/1993 | Grube et al. ........................... | 455/89 |
| 5,212,721 | 5/1993 | DeLuca et al. ......................... | 379/57 |
| 5,243,646 | 9/1993 | McCarthy .............................. | 379/356 |
| 5,247,565 | 9/1993 | Joglekar et al. ........................ | 379/355 |
| 5,276,729 | 1/1994 | Higuchi et al. ........................ | 379/356 |
| 5,297,203 | 3/1994 | Rose et al. ............................. | 379/61 |
| 5,303,288 | 4/1994 | Duffy et al. ............................ | 379/59 |
| 5,487,108 | 1/1996 | Atkins et al. .......................... | 379/355 |

FOREIGN PATENT DOCUMENTS

| | | | |
|---|---|---|---|
| 0404451 | 12/1990 | European Pat. Off. . | |
| 0435614 | 7/1991 | European Pat. Off. . | |
| 2819386 | 11/1979 | Germany ................................ | 379/59 |
| 2251357 | 7/1992 | United Kingdom . | |

OTHER PUBLICATIONS

NEC Corporation "Instruction Manual of TR5E1320–32A(H) Mobile Cellular Telephone Set" Oct. 1990.

Nec Corporation, "Instruction Manual of TR5E1320–2A Nec Portable Cellular Telephone", Mar. 1990.

2832374–DE, Translation of Foreign Patent Oct. 1979.

Primary Examiner—Jeffery Hofsass
Assistant Examiner—Scott L. Weaver
Attorney, Agent, or Firm—Foley & Lardner

[57] ABSTRACT

As shown in FIG. 1, a hands free phone set includes a main phone which includes the usual phone functions, including a main delta processing means, main memory for storing data for the main data processing means and data input means for inputting data and initiating phone operations. A remote controller includes a controller data processing means, controller memory means and command input means for inputting command data to the controller data processing means. There is a data communication means for transferring data from the main data processing means to the controller data processing means for copying data from the main memory means to the controller memory means and for transferring data in the opposite direction for control operations of the main phone.

10 Claims, 7 Drawing Sheets

HANDS FREE PHONE SET WITH HAND HELD REMOTE CONTROL FOR CONTROLLING TELEPHONIC FUNCTIONS

BACKGROUND OF THE INVENTION

The present invention is generally related to hands free phone sets. Such a phone set does not require the user to pick up and hold the handset when the user is on the line. This means that the phone set does not restrict the freedom of the user as it leaves his hands free to be able to carry on with other work at the same time. Due to this benefit, such phones are becoming increasingly popular for use in the office and especially as car phones.

In the prior art, the ideal hands free phone set will be able to handle the necessary operations for making or finishing a call such as off-hook, dialling and on-hook by using voice recognition technology. However, this is still in the first stage of actual usage in the market because of its high cost, high power consumption and the complicated formalities to use it. Accordingly, in the usage of present phone sets, it is customary for the phone user to use the keypad on the phone to enable off-hook, dialling and on-hook by touching the particular keys. For instance, to control speaker volume, etc., it will be necessary to key a button on the phone set. This means that the user can still enjoy a hands-free conversation which will occupy most of the actual connection time. However, the user will need to directly operate the keypad at least twice for one call (off-hook and on-hook). In the case of dialling, more complicated formalities are necessary. Normally the user will need to touch the keypad more than ten times to make a call. This will sometimes cause wrong dialling even in normal use. To reduce such an inconvenience, it is becoming more common for phone sets to provide a memory for storing phone numbers. Therefore, instead of keying in the digits for the phone number, it will be necessary simply to key in the short dial number which can then be checked against the corresponding number shown on the display. Some useful improvements similar to the one mentioned above have been introduced, but not very satisfactorily in some cases. For instance, in the case of the car phones, it is very troublesome for a driver to push key buttons and then check the display when only able to glance quickly at the phone set. In addition to this, there is seldom adequate space to install the phone set suitably in the car, not only for the above-reason, but also for safety driving and equipment protection from severe environmental conditions such as strong sunlight irradiation, etc., harmonization with car fascia and also ensuring passenger room is not restricted.

SUMMARY OF THE INVENTION

Accordingly it is the object of the present invention to provide an improved hands free phone set enabling these and other problems to be overcome.

A hands free phone set in accordance with the invention comprises:

a main phone including phone operating means for dialling, making, receiving and ending calls and for other operations; main data processing means for controlling said phone operating means, main memory means for storing data for said main data processing means, data input means for inputting data to said main data processing means for storage in said main memory means and for initiating operations of said phone operating means;

a remote controller for said main phone comprising a controller data processing means; a controller memory means for storing data for said controller data processing means; command input means for inputting command data to said controller data processing means; and data communication means for transferring data from said main data processing means to said controller data processing means so as to cause data stored in the main memory means to be copied to said controller memory means and for transferring data from said controller data processing means to said main data processing means so as to control operations of said phone operating means.

Said data communication means may comprise direct electrical connection means for sending data from said main phone to said controller and wireless means for sending said processed data from said controller to said main phone.

Alternatively, said data communication means may comprise wireless means for sending data from said main phone to said controller; and wireless means for sending said processed data from said controller to said main phone.

The memorized data in said main data memory means of said main phone and memorized data in said controller memory of said controller include a plurality of telephone numbers applicable for short number dialling.

Such data may include both the telephone number and name which correspond to said short number dialling.

The memorized data may also include the same code which is defined to put on said main phone as a security code.

The main data processing means may comprise data comparator means operable to compare a telephone number which is include, in the data received from said controller with the telephone number which is included in the data of said main memory means as the pre-memorized telephone number and inhibit means to prevent the successful setting up of a connection in response to a telephone number from said controller if said data comparator does not detect the same telephone number in the data of said main memory means.

The main data processing means may comprise data comparator means operable independently to compare generated security code data by said data input means with pre-memorized security code data and to compare a received security code data from said controller with said pre-memorized security code data, data sending control means which inhibits data sending from said data processing means to controller unless said generated security code data and inhibit means to prevent the successful setting up of a connection in response to a telephone number which is included in the data received by the main phone unless said received security code data coincides with said pre-memorized security code data.

The command input means of said controller may have keys operable to select and send the data of one particular telephone number to said data processing means of said controller with the aid of displaying said particular telephone number on a display means or of generating audible sounds such that the user recognizes it easily.

The command input means of said controller may have keys operable to select and send the data of one particular telephone number and name corresponding to said particular telephone number to said data processing means of said controller with the aid of displaying said name on a display means or of generating audible sounds such that the user recognizes it easily.

Both said main phone and said controller may include data scrambling means and data de-scrambling means in said main and controller data processing means, respectively, to intensify data security from disclosure in said data communication means.

Both said main phone and said controller may comprise data scrambling means in data transmitting means and data de-scrambling means in data receiving means, respectively, to intensify data security from disclosure in said data communication means.

The data processing means of said main phone and of said controller means may be microcomputers.

Preferably, said controller is battery operated.

The controller may include a radio paging receiver, said paging receiver being operable to select a designated telephone number data from data memorizing means and to send it to said main phone via said data communication means by pushing a key of said command input means, when a call alert signal has been received and confirmed by the user.

The wireless means of said data communication means may consist of an infrared radiation data transmission system.

Alternatively, the wireless means of said data communication means may consist of a radio data transmission system.

As a further alternative the wireless means of said data communication means may consist of an ultrasonic date transmission system.

In accordance with a further aspect of the invention there is provided a hands free phone set comprising a main phone, controller and data communication means between said main phone and said controller;

said main phone comprising phone operating means for making calls, dialling, receiving calls, ending calls and operating specified functions; data generating means for handling said phone operating means; data processing means for processing generated data from said data generating means and received data from data receiving means, and for exchanging data between data memorizing means and said data processing means; data memorizing means for processed data from said data processing means; data transmitting means for processed data to be sent from said data processing means to said controller; and data receiving means from said controller;

said controller comprising data receiving means from said main phone; control means for operating said controller; data processing means for processing data received from said data receiving means and control data from said control means; data memorizing means for processing data from said data processing means; and data transmitting means for processed data to be sent from said data processing means to said main phone;

said data communication means comprising means for sending data from said main phone to said controller; and means for sending data from said controller to said main phone.

DESCRIPTION OF THE PREFERRED EMBODIMENTS

Figure 1:
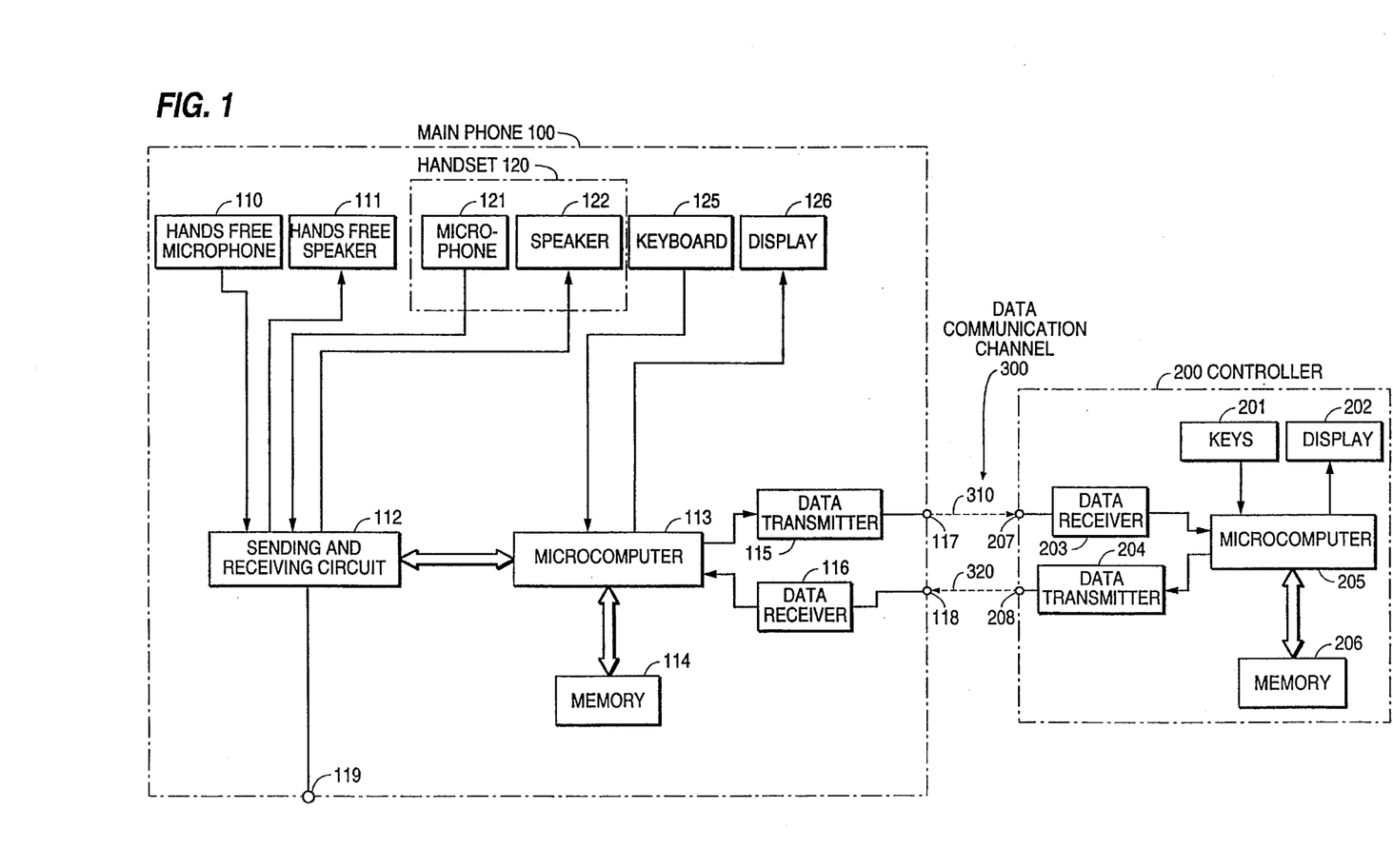
FIG. 1 is a block diagram of one example of a hands free phone set embodying the present invention, the main phone being a hands free fitted phone.

In FIG. 1, there is illustrated a hands free phone set, which comprises a main phone 100, a remote controller 200, and data communication channel 300.

Main phone 100 is illustrated as a hands free fitted phone which may be used while connected to a telephone socket using telephone cord.

Main phone 100 includes a hands free microphone 110, hands free speaker 111, sending and receiving circuit 112, microcomputer 113, memory 114, data transmitter 115, data receiver 116, connection point 117, connection point 118, connection point 119, handset 120, keyboard 125 and display 126. Handset 120 includes microphone 121 and speaker 120.

Controller 200 includes keys 201, display 202, data receiver 203, data transmitter 204, microcomputer 205, memory 206, connection point 207, and connection point 208.

Data communication channel includes a data transmitting channel 310 from data transmitter 115 to data receiver 203, and data transmitting channel 320 from data transmitter 204 to data receiver 116.

Connection point 119 may be connected to connect to telephone cord plug.

Keyboard 125 works as a part of phone operating means for making calls, dialling, receiving calls, ending calls and operating specified functions, and also works as a data generating means to microcomputer 113 for handling phone operating means.

Sending and receiving circuit 112 works as a part of phone operating means together with hands free microphone 110, hands free speaker 111, microcomputer 113, memory 114, keyboard 125 and display 126.

Microcomputer 113 is a data processing channel and manages all necessary data processing in the main phone 100.

Memory 114 stores necessary data for the operation of telephone set such as telephone numbers or numbers and names, set identification number, security code and so on.

Data transmitter 115 is a specially added circuit to send data to controller 200.

Connection point 117 is realized by a certain channel depending on data communication means 310. It may be an electrical connector to be coupled directly or via electrical cable to connection point 207 which should be an electrical connector at this time. That is, the electrical cable serves as a direct electrical connection unit for sending data from the main phone 100 to controller 200.

If the data communication channel consists of an infrared radiation data transmission system, then connection point 117 may be an infrared radiation emitting diode, and connection point 207 may be a phototransistor.

If the data communication channel consists of the radio data transmission system, then both connection points 117 and 207 may be antennas.

And if the data communication channel consists of the ultrasonic data transmission system, then connection point 117 may be an ultrasonic emitter such as ceramic actuator, and connection point 207 may be a supersonic receiver such as ceramic resonator tuned for designated vibration.

Data receiver 116 is also a specially added circuit to receive data from controller 200.

Connection point 118 is realized by a certain channel depending on data communication channel 320. This is the same as the case of connection point 117 and 207 under the condition of data communication channel 310. Then connection point 118 may correspond to connection point 207, and connection point 208 may correspond to connection point 117, when the condition of data communication channel 320 corresponds to data communication channel 310. But it is not necessary that data communication channel 320 corresponds to data communication channel 310 at the same time.

Data receiver 203 receives data via data communication means 310, and sends received data to microcomputer 205. The data receiver 203 may include a clock-generating circuitry or clock-synchronizing circuitry for the completion of data receiving which means that some data stored in memory 114 should be sent to memory 206 with no bit error generation via microcomputer 113, data transmitter 115, data communication means 310, data receiver 203, and microcomputer 205.

This data transmission from memory 114 to memory 206 may not be required often. At least one such operation is necessary to copy necessary data from memory 114 to memory 206. After that, same action may take place when the data in memory 114 has been changed, the data in memory 206 has disappeared by some cause and so on.

Of course, there is another way to get the data into memory 206. That is, keys 201 serve as command input units for inputting command data to microcomputer 205. It can be done by using keys 201 just the same as the main phone 100. In that case, the keys 201 may need many keys to generate the same data stored in memory 114. But such a means is not convenient because the process takes longer, data may be missed, and the controller 200 may have to be bigger to house the necessary keys for generating data.

Data receiver 116 also receives data via data communication channel 320, and sends received data to microcomputer 113.

Then data receiver 116 may include a clock-generating circuitry or clock-synchronizing circuitry for the completion of data receiver 203. In the meantime, it may be convenient for the user to set up suitable means for preventing free use of the telephone set by other people. For this reason, some practical means may be realized.

The first possibility is to check a telephone number in the data sent from controller 200, whether said telephone number corresponds to telephone numbers having been stored in memory 114. This process may be done by microcomputer 113. If it does not correspond, this telephone number is not sent to the sending and receiving circuit 112. As a result, setting up of a connection will not succeed. This means may be useful because other controllers that do not belong to a particular main phone 100 should not be workable for setting up a connection. That is, microcomputer 113 comprises a first data comparator function operable to compare a telephone number which is included in the data received from controller 200 with a telephone number which is included in the data of memory 114 as a pre-memorized telephone number and a first inhibit function to prevent the successful setting up of a connection in response to a telephone number from controller 200 if the first data comparator function does not detect the same telephone number in the data of memory 114.

A second possibility is to check a security code which may be given independently to the main phone by the user, which may be stored in memory 114 and 206, and which may be included in data received by data receiver 116. This arrangement may be used alone or together with the first possibility mentioned above. More specifically, microcomputer 113 comprises a second data comparator function operable independently to compare generated security code data by keyboard 125 with pre-memorized security code data and to compare a received security code data from controller 200 with the pre-memorized security code data and a second inhibit function to prevent the successful setting up of a connection in response to a telephone number which is included in the data received by main phone 100 unless the received security code data coincides with the pre-memorized security code data.

A third possibility is to prevent easy data transmission from main phone 100 through connection point 117. It may not contribute to expose data having been stored in memory 114 except when necessary.

Data transmission may be achieved only in the time that a specially defined code such as a security code is generated on the keyboard 125 to allow data sending. That is, microcomputer 113 comprises a data sending control function which inhibits data sending from microcomputer 113 to controller 200 unless the generated security code data coincides with the pre-memorized security code data.

A fourth means is to prevent easy data decoding by monitoring data communication channels 310 and 320. For this purpose, data scramble and de-scramble means may be established in the circuits concerned. One idea is to establish them in the microcomputer 113 and 205. That is, the microcomputers 113 and 205 comprise a data scrambling function and a data de-scrambling function, respectively, to intensify data security from disclosure in data communication channel 300. Another idea is to establish data scramble means in data transmitters 115 and 204, and data de-scramble means in data receivers 116 and 203. In other words, data transmitters 115 and 204 and data receivers 116 and 2103 comprise a data scrambling function and a data de-scrambling function, respectively, to intensify data security from disclosure in data communication channel 300.

It is, of course, reasonable to combine the various means described above for optimum effectiveness.

Figure 2:
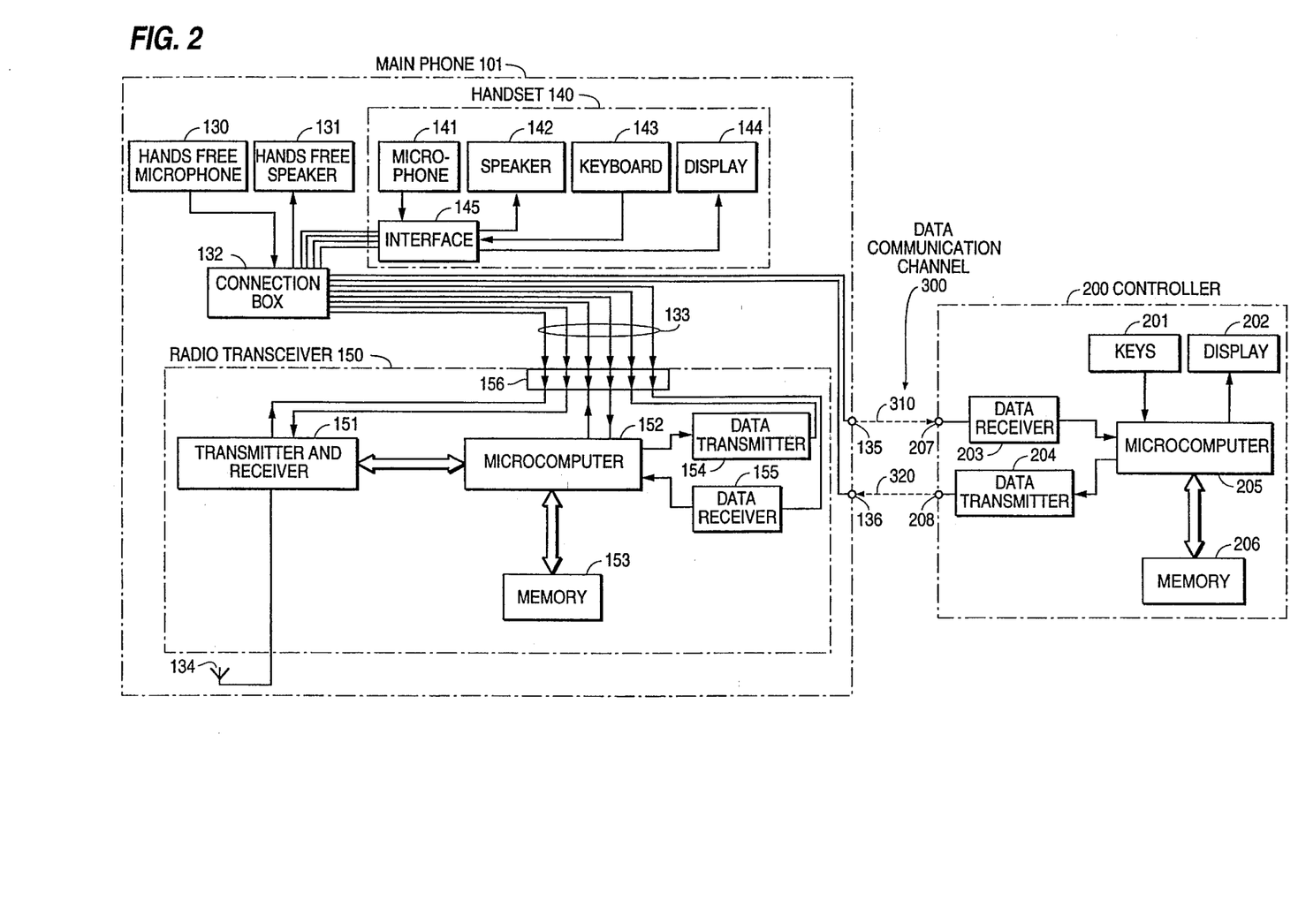
FIG. 2 is a block diagram of another example of a hands free phone set embodying the present invention, the main phone being a hands free mobile cellular telephone which may be used in a car.

In FIG. 2, there is illustrated another hands free phone set which comprises main phone 101, controller 200,, and data communication channel 300.

Main phone 101 is illustrated as a hands free mobile cellular telephone which may be used in a car. Controller 200 and data communication channel 300 are the same as those shown in FIG. 1. Main phone 101 includes a hands free microphone 130, hands free speaker 131, connection box 132, extension cable 133, antenna 134, connection point 135, connection point 136, handset 140, and radio transceiver 150. Handset 140 includes microphone 141 speaker 142, keyboard 143, and display 144.

Radio transceiver 150 includes transmitter and receiver 151, microcomputer 152, memory 153, data transmitter 154, data receiver 155, and connection point 156. Connection box 132 may be used to connect hands free microphone 130, hands free speaker 131, handset 140, connection point 135 and connection point 136 to radio transceiver 150 via extension cable 133. Antenna 134 may be used to emit radio frequency output power from transmitter and to receive radio frequency input from a base station to establish communication via radio communication network. Transmitter and receiver 151 may work as a part of phone operating means together with hands free microphone 130, hands free speaker 131, connection box 132, extension cable 133, antenna 134, microcomputer 152 and memory 153.

Microcomputer 152, memory 153, data transmitter 154, and data receiver 155 may have the same functions for the present invention compared with those of main phone shown in FIG. 1, respectively.

Figure 4:
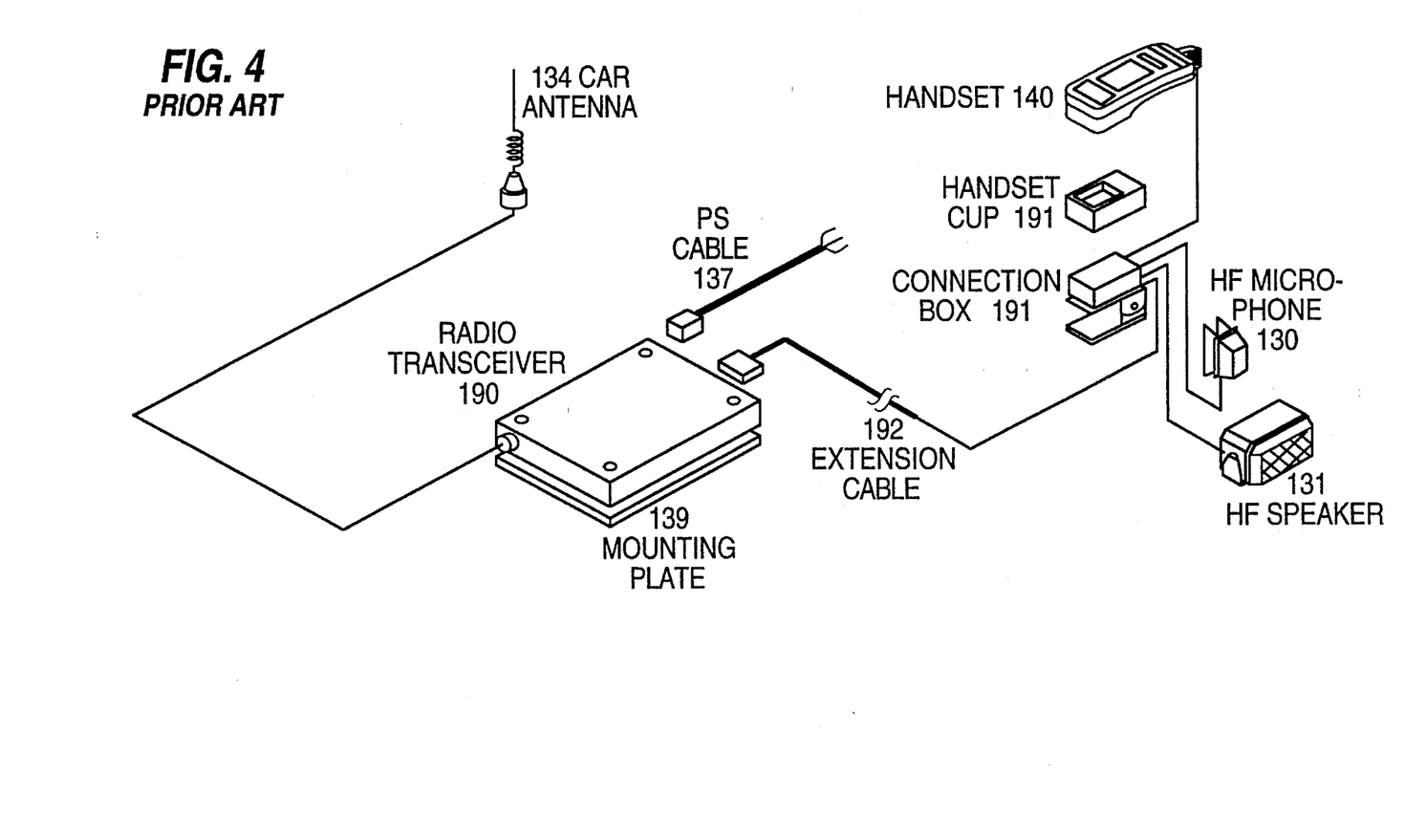
FIG. 4 shows an actual system configuration of the conventional hands free cellular phone using the NEC mobile cellular telephone, model TR5E1320-32A.

FIG. 4 shows an actual system configuration of the conventional hands free cellular phone using the NEC mobile cellular telephone, model TR5El320-32A.

It is shown and described in the instruction manual of TR5El320-32A NEC mobile cellular telephone. This manual may be obtained from Radio Division, NEC (UK) Ltd., 221 Dover Road, Slough SL1 4RS.

In FIG. 4, there are illustrated some other components such as PS cable 137, handset cup 138, mounting plate 139, radio transceiver 190, connection box 191, and extension cable 192.

PS cable is used to supply power source for car battery. Handset cup 138 is used to fix a handset 140 and also has the function of off-hook and on-hook together with handset 140. Mounting plate 139 is used to fix a radio transceiver 150 to a car.

Generally speaking, HF microphone 130, HF speaker 131 connection box 132, handset cup 138, and handset 140 should be set in the passenger room of a car in terms of being managed by a user, and radio transceiver 150 may be set in the boot or elsewhere convenient to be set.

Radio transceiver 190 is different from radio transceiver 150 in consequence of no existence of data transmitter 154 and data receiver 155.

Connection box 191 may be different from connection box 132 because of no necessity of connection to connection point 135 and connection point 136.

Extension cable 192 may also be different from extension cable 133 because of the same reason as the connection box.

Figure 5:
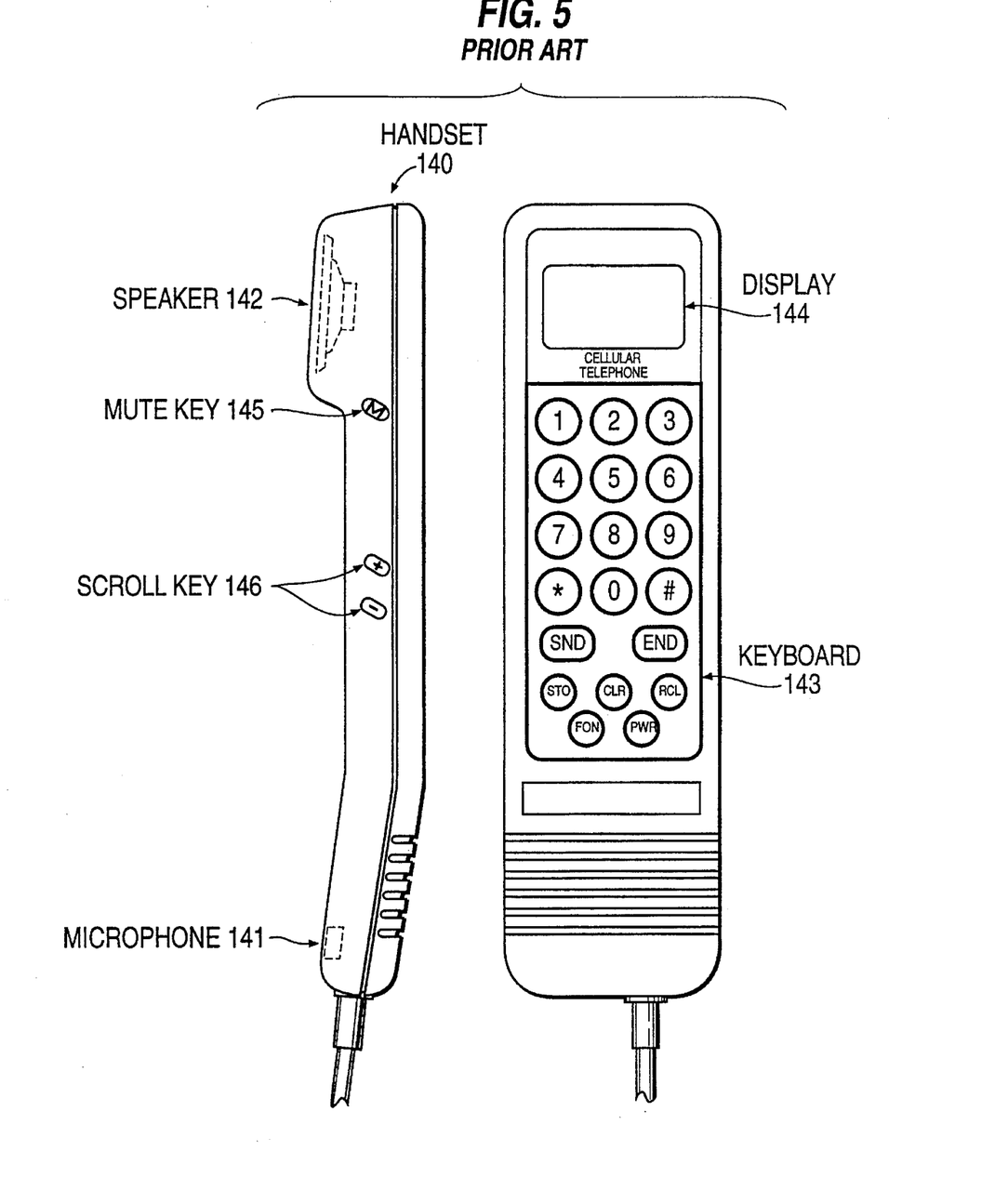
FIG. 5 shows a typical type of handset actually used in the NEC mobile cellular telephone, model TR5EI320-32A.

FIG. 5 shows a typical type of handset actually used in the NEC mobile cellular telephone, model TR5El320-32A.

It is also shown and described in the instruction manual mentioned above about how to operate it. The operation summary arranged in functional order is shown in Table 1 (which includes Table 1-1 to 1-3).

TABLE 1

| OPERATION SUMMARY ARRANGED IN FUNCTIONAL ORDER | |
|---|---|
| NOTE: | (XX) = Memory location: 00 through 99.<br>(XXX)= Your 3-digit temporary lock code.<br>(XXXX) = Your confidential 4-digit access code.<br>You may press (#) key for (+) button.<br>You may press (*) key for (−) button<br>For volume control, you cannot use (#) or (*) key for (+) or (−) controls.<br>Only (+) or (−) button can control the volume. |

TABLE 1-1

| SUMMARY OF BASIC OPERATIONS | |
|---|---|
| POWER ON/OFF | |
| Power On/Off: | [PWR] (toggle) |
| AT STANDBY | |
| Receiving Signal Strength Indicator: | Five blocks appear at maximum level. |
| Unlocking Electronic Lock: | [FCN] [6], [XXXX] or [XXX], [1], [+]/[−], [STO] for unlocked, then [CLR] to exit. |
| Backlighting Keypad & Display: | Any key except [PWR] will backlight them for just 10 sec in portable use. |
| Backlighting On/Off Control: | [M] button (toggle) in car-mount use. |
| PLACING A CALL | |
| Entering Phone Number on Display: | [PHONE NUMBER] |
| Sending a Number on Display: | [SND] |
| Reviewing a Longer Number: | [FCN] (hold) with a long number |
| Clearing the Last Digit: | [CLR] (quickly) |
| Clearing All Digits: | [CLR] (hold) |
| ENDING A CALL | [END] while in use |
| RECEIVING A CALL | Any key except [PWR], while ringing |
| TALKING ON THE PHONE | |
| Muting Control: | [M] (quickly) while in use |
| Holding the Line: | [M] (hold) while in use |
| Earpiece Volume Control: | [+] or [−] in mute-off mode |
| Speaker Volume Control: | [+] or [−] in standby or mute mode |
| Hands-Free Volume Control: | [+] or [−] in hands-free mode |

TABLE 1-2

SUMMARY OF ADVANCED DIALING OPERATIONS

| | |
|---|---|
| LAST NUMBER REDIAL | |
| Last Number Redial: | [SND] with clear display. |
| Recalling the Last-Dialed Number: | [RCL] [0] [0], then [SND] to dial it. |
| Recalling Recently Dialled Number: | [RCL] [0] [0], then [+]/[−] for scrolling screens up to 4 recently dialled numbers, then [SND] to dial it. |
| SPEED DIAL | |
| Speed Dialling from Memory: | [RCL] [XX] , [SND] |
| Searching by Memory Location Order: | [RCL] [XX] [+]/[−], [8 SND] |
| Searching by Alphanumeric Order: | [RCL] [+]/[−], [RCL] again if you want to slap to next alphabetic group, then [SND] |
| STORING PHONE NUMBER | |
| Storing a Phone Number: | [PHONE NUMBER] [ALPHA-TAG] [STO] [XX] |
| Automatic Store: | [PHONE NUMBER] [ALPHA-TAG] [STO] (hold) |
| Automatic Store (Grouping Store): | [PHONE NUMBER] [ALPHA-TAG] [STO] [*], then any digit key for group number. |
| Flashing Number after Storing: | [STO] to replace the old with new one, or [+]/[−] to search vacant memory, then [STO] to store it in a vacant memory. |
| ENTERING ALPHA-TAG MODE | |
| Typing Alphanumeric Tag: | [FCN] [3] [1] with a number on display, [+]/[−] to select a character, [#] to type it and move to the next, repeat the tag entry, [STO] [XX] to store the alpha-tag. |
| Correcting Text in Alpha-Tag Mode: | [CLR] (quickly) to delete a character, [CLR] (hold) to cancel the mode. |
| SCRATCHPAD MEMORY | |
| Writing to Scratchpad Memory: | [PHONE NUMBER] while in use, the number stays on display after the call ends. Store it to speed dial memory by using STORE function. |
| ENTERING PAUSED-DTMF MARKS: | [FCN] [0], then P mark appears. |
| AUTOMATIC REPEAT DIAL: | [FCN] [SND] with a number on display, [SND]/[M] after connected to the line, [END] to retry another repeat dial, or [CLR] to cancel Auto Dial. |

TABLE 1-3

| SUMMARY OF EXTENDED OPERATIONS | |
|---|---|
| FUNCTION MENU | |
| Reviewing 1st Function Menu: | [FCN] (hold) with clear display, [+]/[−] for scrolling screens, [STO] or press the flashing digit key to enter second function menu, [CLR] to exit. |
| Reviewing 2nd Function Menu: | Enter second function menu, [+]/[−] for scrolling screens, [STO] or press the flashing digit key to enter the function, [CLR] to exit. |
| TIMER FUNCTION | |
| Total Talk Time on Preferred System: | [FCN] [1] [1], then [CLR] to exit. |
| Total Talk Time on Non-Pref System: | [FCN] [1] [2], then [CLR] to exit. |
| Talk Time of the Last Call: | [FCN] [1] [3], then [CLR] to exit. |
| Cumulative Units on Preferred System: | [FCN] [1] [4], then [CLR] to exit. |
| Cumulative Units on Non-Pref. System: | [FCN] [1] [5], then [CLR] to exit. |
| Reviewing Remaining Credit Units: | [FCN] [1] [6], then [CLR] to exit. |
| CLOCK FUNCTIONS | |
| Setting Time of Clock: | [FCN] [2] [1], [+ ]/[−], [STO] for hours, [+]/[−], [STO] for minutes, or [CLR] to exit. |
| Automatic Power On/Alarm Clock: | [FCN] [2] [2], [+]/[−] [STO] for set or reset, [+]/[−] [STO] for ALM or PWR, [+]/[−], [STO] for hours, [+]/[−], [STO] for minutes, or [CLR] to exit. |
| Automatic Power Off- | [FCN] [2] [3], [+]/[−] [STO] for set or reset, [+]/[−] [STO] for power-off timer, or [CLR] to exit. |
| Display Clock On/Off- | [FCN] [2] [4], [+]/[−], [STO] for on or off, or [CLR] to exit. |
| MEMORY FUNCTIONS | |
| Entering Alpha-Tag Mode: | [FCN] [3] [1] with a number on display, [+]/[−] to select a character, [#] to type it and move to the next, repeat the tag entry, [STO] [XX] to store the alpha-tag. |
| Correcting Text in Alpha-Tag Mode: | [CLR] (quickly) to delete a character, [CLR] (hold) to cancel the mode. |
| Entering Wake-Up Message: | [FCN] [3] [2] [+]/[−] to select a character, [#] to type it and move to the next, repeat the tag entry, [CLR] (quickly) to delete a character, [CLR] (hold) to cancel the mode, [STO] to store the message. |
| Reviewing Own Phone Number: | [FCN] [31 [3], then [CLR] to exit. |
| TONE FUNCTIONS | |
| Alert Tone Volume Control: | [FCN] [4] [1], [+]/[−], [STO] at good volume, or [CLR] to exit. |
| Escalating Call Alert: | [FCN] [4] [2], [+]/[−], [STO] for on or off, or [CLR] to exit. |
| Keypad Tone On/Off: | [FCN] [4] [3], [+]/[−] [STO] for on or off, or [CLR] to exit. |
| DTMF Signalling Control (Long DTMF): | [FCN] [4] [4], [+]/[−], [STO] for on or off, or [CLR] to exit. |
| SPECIAL FUNCTIONS | |
| Automatic Answer On/Off: | [FCN] [5] [1], [+]/[−], [STO] for on or off, or [CLR] to exit. |
| Battery Saving Mode (Power Class Section): | [FCN] [5] [2], [+]/[−], [STO] for on or off, or [CLR] to exit. |
| LOCK CODE FUNCTIONS | |
| Electronic Lock/Unlock: | [FCN] [6], [XXXX] or [xxx], [1], [+]/[−], [STO] for Unlocked, PL, FL, or [CLR] to exit. |
| Bar International Dialling: | [FCN] [6], [XXXX] [2] |

TABLE 1-3-continued

SUMMARY OF EXTENDED OPERATIONS

|  |  |
|---|---|
|  | [+]/[−], [STO] for on or off, or [CLR] to exit. |
| Locking Speed Dial Memory: | [FCN] [6], [XXXX] [3], [+]/[−], [STO] for on, off, or read only, or [CLR] to exit. |
| Programming Temporary Lock Code: | [FCN] [6] [XXXX], [4], [XXX], [STO] for 3-digit, or [CLR] to exit. |
| Rest and Default Functions: | [FCN] [6], [XXXX], [5], [STO] , for reset, or [CLR] to exit. |
| Setting Maximum Credit Units: | [FCN] [6], [XXXX], [6], [+]/[−], [STP] for on or off, Enter 4-digit credit units, [STO] to store, or [CLR] to exit. |
| OPTION FUNCTION |  |
| Radio Mute & Call Alert On/Off | [FCN] [7] [1], [+]/[−], [STO] for on or off, then [CLR] to exit. |

The same handset 140 may be used for the realization of the present invention by means of adding minor modifications to the micro computer software. The simplest modification to be added may be such that data transmission from main phone 101 to controller 200 via data communication channel 310 should be controlled by using some keys on the keyboard 143.

It may be realized by making new additional software to enable new option function shown in Table 2. Table 2 may be added to Table 1-3 of Table 1.

TABLE 2

NEW FUNCTIONAL ORDER

| OPTION FUNCTION | |
|---|---|
| DATA TRANSMISSION ON: | [FCN] [7] [2] |
|  | [+]/[−], [SND] |
| OR |  |
| DATA TRANSMISSION ON: | [FCN] [7], [XXXX] OR |
|  | [XXX], [2] [+]/[−], (SND) |

[XXXX] OR [XXX] shown in Table 1 means security code, which has the same meaning shown as a confidential 4 digit access code or a 3 digit temporary lock code described in the instruction manual mentioned above and applied to Table 3-1 to 3-3 of FIG. 6.

Figure 3:
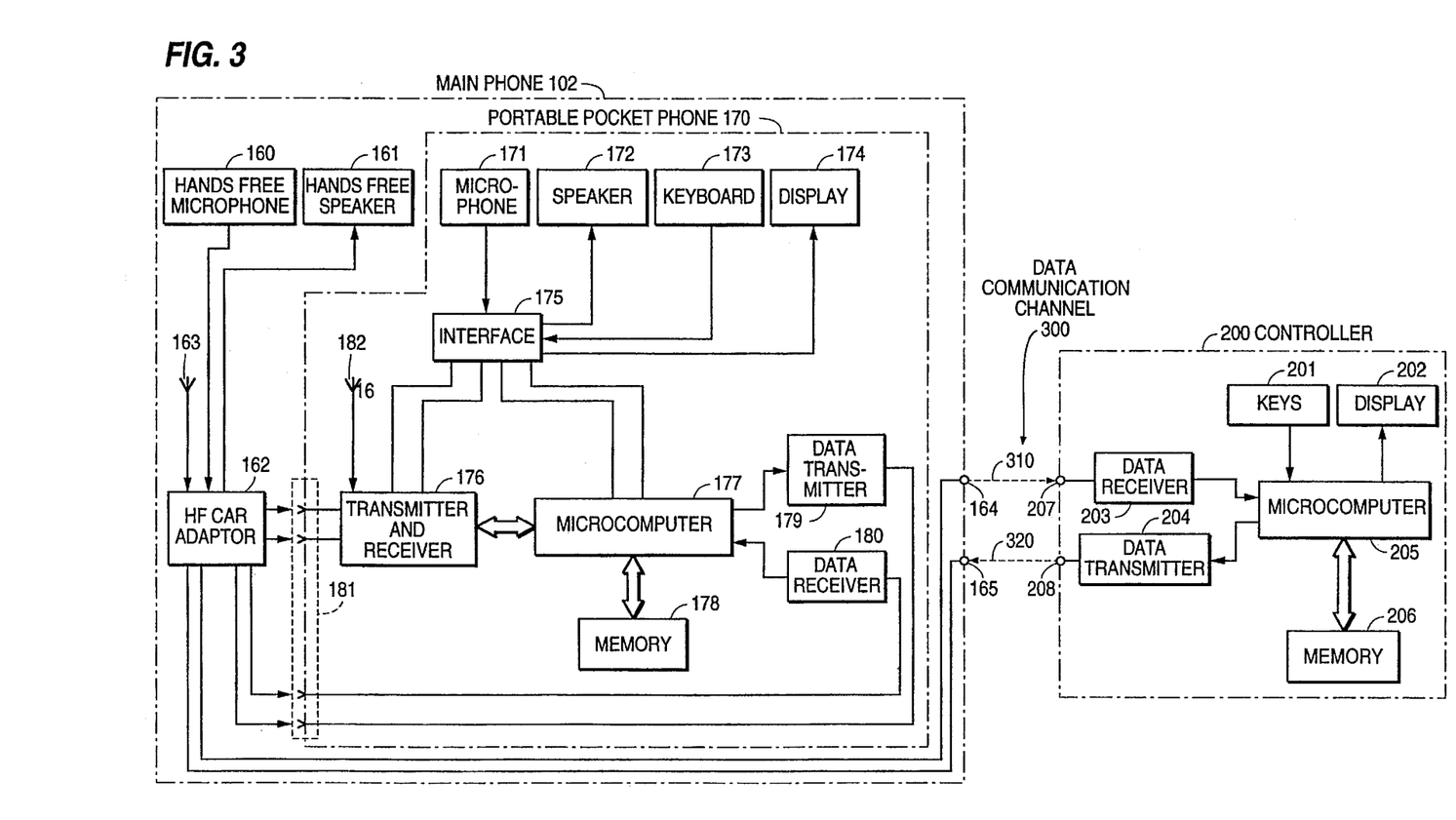
FIG. 3 is a block diagram of yet another example of a hands free phone set embodying the present invention, the main phone being a hands free mobile cellular telephone which includes hands free car adaptor and portable pocket phone.

In FIG. 3, there is illustrated yet another hands free phone set embodying the present invention, which comprises main phone 102, controller 200, and data communication channel 300. Main phone 102 is illustrated as a portable pocket phone which may be used in a car with car adaptor. Controller 200 and data communication channel 300 are the same as those shown in FIG. 1 and FIG. 2, respectively.

Main phone 102 includes a hands free microphone 160, hands free speaker 161, HF car adaptor 162, car antenna 163, connection point 164, connection point 165 and portable pocket phone 170. Portable pocket phone 170 includes microphone 171, speaker 172, keyboard 173, display 174, interface circuitry 175, transmitter and receiver 176, microcomputer 177, memory 178, data transmitter 179, data receiver 180, connector 181 and antenna 182. HF car adaptor 162 may be used to connect hands free microphone 160, hands free speaker 161, car antenna 163, connection point 164, connection point 165, and portable pocket phone 170.

Car adaptor 162 may construct both data transmission lines from data transmitter 179 to connection point 164 and from connection point 165 to data receiver 180 via connector 181.

HF car adaptor 162 may include hands free circuitry to amplify both audio signals from hands free microphone 160 to portable pocket phone 170 and from portable pocket phone 170 to hands free speaker 161. HF car adaptor 162 may also include battery charging circuitry for portable pocket phone 170.

Antenna 163 may be used to emit radio frequency output power from transmitter and to receive radio frequency input from a base station to establish communications via radio communication network. Transmitter and receiver 176 may work as a part of phone operating means together with hands free microphone 160, hands free speaker 161, HF car adaptor 162, antenna 163, microcomputer 177, and memory 178.

Microcomputer 177, memory 178, data transmitter 179 and data receiver 180 may have the same functions for the present invention compared with those of main phone in FIG. 1 and FIG. 2, respectively.

Figure 6:
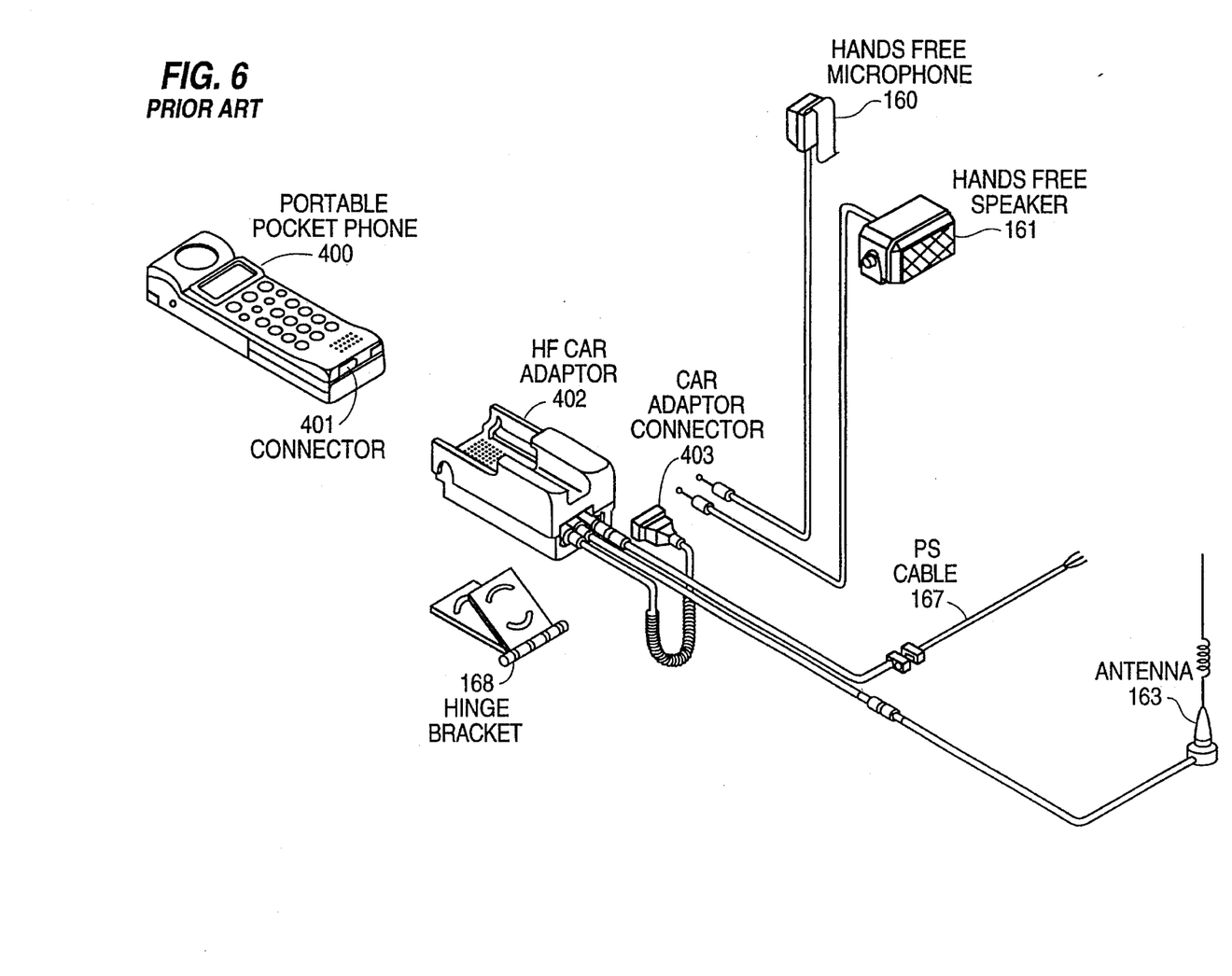
FIG. 6 shows an actual system configuration of the conventional hands free cellular phone using the NEC mobile cellular telephone model TR5E1320-22A.

FIG. 6 shows an actual system configuration of the conventional hands free cellular phone using the NEC mobile cellular telephone, model TR5E1320-22A.

It is shown and described in the instruction manual of TR5E1320-22A NEC mobile cellular telephone. This manual may also be obtained from Radio Division, NEC (UK) Ltd., 221 Dover Road, Slough SL1 4RS.

In FIG. 6, there are illustrated some other components such as PS cable 167, hinge bracket 168, portable pocket phone 400, connector 401, HF car adaptor 402, and car adaptor connector 403.

PS cable 167 is used to supply a power source from the car battery. Hinge bracket 168 is used to fix HF car adaptor 402 to a car. Portable pocket phone 400 is different from portable pocket phone 103 in consequence of no existence of data transmitter 179 and data receiver 180.

Connection 401 may physically be the same as connection 181. HF car adaptor 402 is different from HF car adaptor 162 as there is no need to prepare connection point 164 and 168 on it or in a suitable place.

In FIG. 3 data generating means may be constructed using keyboard 173, display 174, interface 175, and microcomputer 177, and generated data may be used to operate main phone 103 and stored in memory 178 in case of necessity.

The operational summary arranged in functional order may be realized by the same means as the case of mobile cellular telephone, model TR5El320-32A mentioned above.

It means that the operational summary arranged in functional order may be the same as Table 1-1 to 1-3 of Table 1 with some exceptions, and the smallest modifications software into microcomputer 177 to be added for the present invention may claim that data transmission from main phone 102 to controller 200 via data communication channel 310 should be controlled by using some keys on the keyboard 173.

The above may be satisfied by incorporating new additional software to enable the new function in Table 2, shown above.

Figure 7:
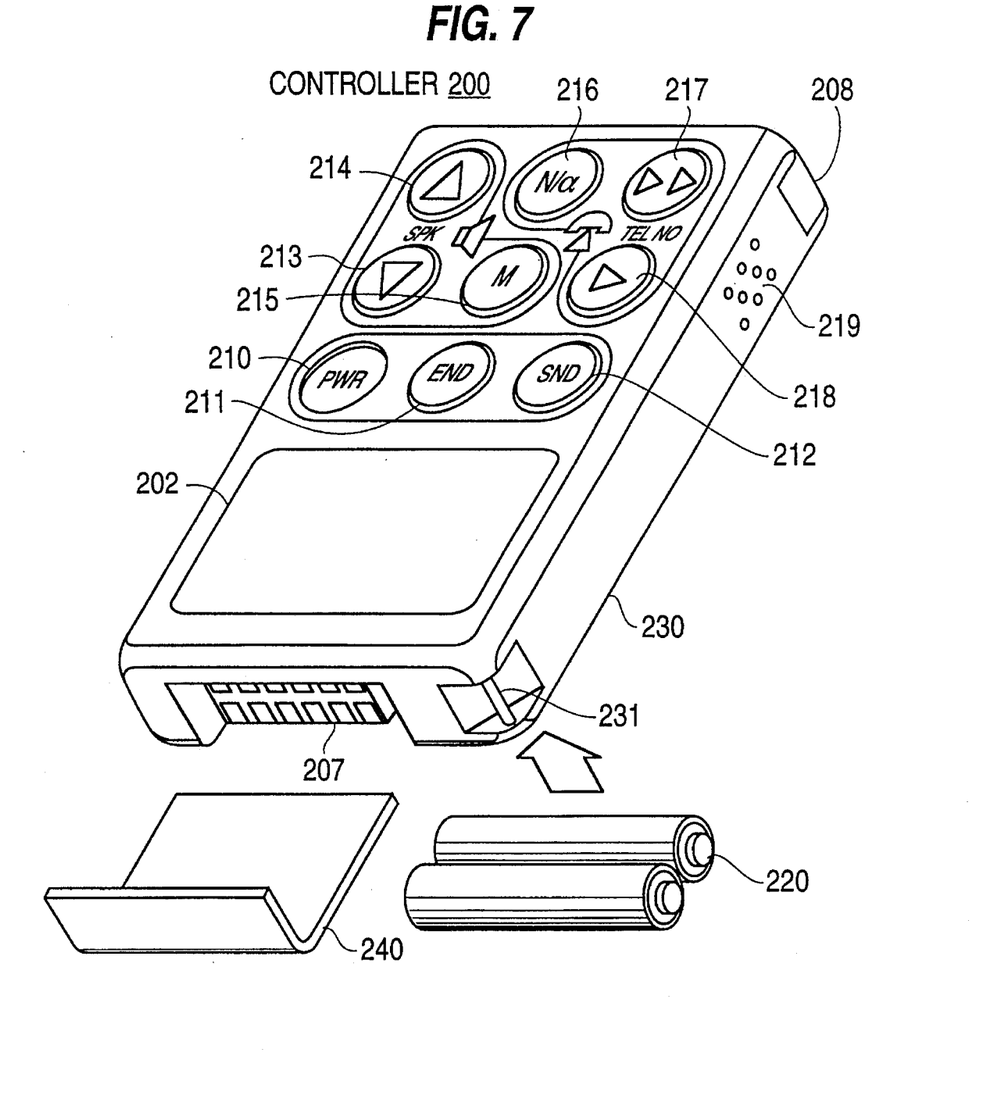
FIG. 7 is a rough sketch of a remote controller which may be used in conjunction with the phone sets of FIG. 1 to FIG. 3.

In FIG. 7, there is illustrated a controller which may be used in embodiments of the present invention.

Controller 200 includes data receiver 203, transmitter 204, microcomputer 205, memory 206, connection point 207, battery 220, and sounder 219 at the inside of the main case 230.

On the surface of the main case 230, there are arranged keys 201, display 202, and connection point 208.

Keys 201 includes power key 210, end key 211, send key 212, speaker volume down key 213, speaker volume up key 214, mute key 215, mode key 216, telephone number select key 217, and telephone number select key 218.

The controller 200 comprises a main case 230 and battery cover 240. Main case 230 includes holder 231.

Power key 210 is used to switch on-off controller 200 by pressing the key in turns. When switched on, a message showing "switched on", "battery condition", "telephone number searching mode", "mute" and so on may come on display 202.

End key 211 is used for ending a call. Send key 212 is used to send control data to main phone for setting up a call or receiving a call.

Speaker volume down key 213 is used to decrease the volume of the hands-free speaker. Speaker volume up key 214 is used to increase the volume of the hands-free speaker.

Mute key 215 is used to switch on-off the mute mode.

Mode key 216 is used to select the telephone number searching mode within two modes that are determined by the data processing program in microcomputer 205.

Key 217 and 218 are used to search for a telephone number in accordance with mode. For instance, it is assumed that the mode key 216 has two modes such as "address mode", and "name mode", and address is defined as a two-digit number such as 87.

Assuming that key 216 has selected address mode, then if key 217 is pressed, microcomputer 205 may work to scroll through 0 to 9 of tens of address numbers and display each number on display 202 in turns. That is, keys 216 and 217 are operable to select and send the data of one particular telephone number to microcomputer 205 with the aid of displaying the particular telephone number on display 202. Similarly, 0 to 9 of units of address numbers may be scrolled through and displayed by pressing key 218. Thus, the user may obtain the desired address number, and the user may see a telephone number and name on display 202. That is, keys 216–218 are operable to select and send the data of one particular telephone number and name corresponding to the particular telephone number to microcomputer 205 with the aid of displaying the name on display 202.

On the other hand, assuming that key 216 has selected name mode, then if key 217 is pressed, microcomputer 205 may work to scroll through A to Z and 0 to 9 and display each letter on display 202 in turns.

This letter may be the first letter of name such as A of "Austin".

Key 218 may be pressed to search the full name of Austin. Then microcomputer 205 may work to scroll through A to Z and 0 to 9 for the second letter, the third letter and so on to search for the name sought by user.

Thus, the user may be able to use controller 200 just like an electronic phone book instead of traditional phone number memo, and it is easy to rewrite, erase, and add numbers and names to it.

Connection point 207 is illustrated as a connector. In this case data communication channel 310 may be constructed by electrical cable or by direct connection of connector 207 and the other connector which should be prepared on main phone such as connection point 117 in FIG. 1, connection point 135 or connector 156 in FIG. 2, and connection point 164 or connector 181 in FIG. 3, when necessary.

Connection point 208 is illustrated on the edge of main case 230. This may be constructed by using infrared radiation emitting diode or ultrasonic emitter.

Sounder 219 may generate sound in accordance with the order of microcomputer 205 to give some alerts to the user. In other words, sounder 219 acts as audible sound generating unit for generating audible sounds such that the user recognizes it easily.

Battery 220 may be the combination of dry batteries for their ease of acquisition and effective price.

Holder 231 may be used to hold a strap or other such devices.

Battery cover 240 may be useful not only as a battery cover, but also as a protector for connection point 207.

It may be easy to associate the controller 200 with a radio pager because of its appearance and some similar circuitry included. For instance, if a data receiver is realized as a radio receiving circuitry for a pager system, received data may be processed by microcomputer 205, stored in memory 206, and displayed on display 202 when necessary. Sounder 219 may give an alert when data is received.

In the normal use of a radio pager, it is usual to make a call to a designated telephone number or a number indicated on the display. In case of the former, the user may search a designated number and send it to the main phone. In the case of the latter, the user may send that number by only pressing the send key 212.

Of course, in this case it is not necessary for connection point 207 to be an antenna for radio pager.

Connection point 207 may be realized as the best means to satisfy the necessary conditions such as smallness, lightweight, low power consumption, ease of use, cost effectiveness, and so on.

It may bring another benefit for the user to use controller 200 as a radio pager, because the radio paging service area may be wider spread than that of mobile cellular telephone service, and the call charge of a radio pager may also be lower than that of the other.

As a summary, the present invention may bring the following effects:

Firstly, it is not necessary for the user to approach the telephone. Accordingly, position free may be established.

Secondly, it may solve problems raised in a car. This means that the driver may use the hands-free phone more easily than heretofore as he/she can manage it in his/her own hand. Accordingly it may not be necessary for the main phone or handset of the main phone to be installed close to the driver's seat to enable touching of keys of telephone. Thus, it may also enable the installation of the main phone in a suitable place where the equipment can be protected from severe environmental conditions, such as strong sunlight and irradiation. Harmonization with car fascia may be improved and passenger room restriction may be eased.

Thirdly, controller 200 may be useful as a handy electronic phone book.

Fourthly, controller 200 may have a further benefit in combination with radio paging functions to enlarge or complement areas to be used actually and with cost effectiveness.

I claim:

1. A hands free phone set, comprising:
   a main phone, including:
      phone operating means for enabling user to dial, make, receive and end calls;
      main data processing means for controlling said phone operating means;
      main memory means for storing data for said main data processing means, said data including telephone numbers;
      comparing means for comparing a destination telephone number with the telephone numbers stored in said main memory means; and
      data input means for inputting data into said main data processing means for storage in said main memory means and for initiating operations of said phone operating means;
   a remote controller for said main phone, including:
      controller data processing means;
      controller memory means for storing data for said controller data processing means;
      command input means for inputting command data into said controller data processing means; and
      data communication means for transferring data from said main data processing means to said controller data processing means so as to cause data stored in the main memory means to be copied to said controller memory means and for transferring data from said controller data processing means to said main data processing means so as to control the main data processing means and operations of said phone operating means,
   wherein the remote controller includes a radio paging receiver, said paging receiver including a radio receiving circuit, a sounder, and a display, and wherein when a call alert signal has been received by the radio receiving circuit, the user is given confirmation of reception of the call alert signal by the controller data processing means of the remote controller providing activation of the sounder and by the controller data processing means of the remote controller providing display of a designated telephone number data included in the call alert signal on the display, said paging receiver being operable to provide selection of said designated telephone number data provided on the display and to send said designated telephone number data to said main phone via said data communication means by said user pushing a key of said command input means, and
   wherein the remote controller includes transmitting means for transmitting said destination telephone number to said main phone, said comparing means of the main phone allowing a setting up of a telephone call to said destination telephone number if said destination telephone number matches one of said telephone numbers stored in said main memory means.

2. A hands free phone set as claimed in claim 1, wherein said data communications means includes wireless means.

3. A hands free phone set as claimed in claim 2, wherein said wireless means is an infra-red radiation data transmission system.

4. A hands free phone set as claimed in claim 2, wherein said wireless means is a radio frequency data transmission system.

5. A hands free phone set as claimed in claim 2, wherein said wireless means is an ultrasonic data transmission system.

6. A hands free phone set as claimed in claim 1, wherein said remote controller further comprises:
   security code transmitting means for transmitting a security code to said main phone; and
   input means for receiving a user-inputted security code; and
   wherein said main phone further comprises:
      second comparing means for comparing the user-inputted security code with a predetermined security code,
   wherein said predetermined security code is stored in said main memory means, and
   wherein if said second comparing means determines that said user-inputted security code matches said predetermined security code, said second comparing means allows the setting up of the telephone call to said destination telephone number.

7. A hands free phone set as claimed in claim 6, wherein said main phone and said remote controller each further comprise:
   data scrambling means for scrambling data to be sent via said data communications channel; and
   data descrambling means for descrambling data received, via said data communications channel.

8. A hands free phone set as claimed in claim 1, wherein said main phone further comprises:
   a portable pocket phone, said portable pocket phone housing said phone operating means, said main data processing means, said data input means, and said main memory means;
   a car adaptor for providing connection of said portable pocket phone to electronics of a vehicle;
   a hands free microphone coupled to said car adaptor for inputting speech signals audibly made by said user to said portable pocket phone; and
   a hands free speaker coupled to said car adaptor for outputting speech signals from the set up telephone call so as to be heard by the user.

9. A hands free phone set as claimed in claim 1, wherein said remote controller includes:
   a mode key for setting, as a selected mode, said remote controller to one of an address mode and a name mode;
   a telephone number key for setting said remote controller to a telephone number display mode; and
   a display key for sequentially displaying data stored in said controller memory means to said display, said data stored in said controller memory means being sequentially displayed as a telephone number along with a corresponding one of an address and a name also stored in said controller memory means along with each stored telephone number based on the selected mode when the telephone number key is depressed by the user.

10. A hands free phone set as claimed in claim 1, wherein said remote controller includes:

a power key to turn said remote controller in one of an on state and an off state, said power key turning said remote controller to said off state when said remote controller is currently in said on state and the user presses said power key, said power key turning said remote controller to said on state when said remote controller is currently in said off state and the user presses said power key; and an end key to end an existing telephone call when pressed by the user.

* * * * *